US010072749B2

(12) United States Patent
Reth et al.

(10) Patent No.: US 10,072,749 B2
(45) Date of Patent: Sep. 11, 2018

(54) TRANSFER CASE WITH VENT/OIL DEFLECTOR ASSEMBLY

(71) Applicant: Magna Powertrain of America, Inc., Troy, MI (US)

(72) Inventors: Borin Reth, Rochester Hills, MI (US); Daniel M. Drill, Rochester, MI (US); Faris Zahid, Southfield, MI (US); Jerome Cooper, Westland, MI (US)

(73) Assignee: MAGNA POWERTRAIN OF AMERICA, INC., Troy, MI (US)

( * ) Notice: Subject to any disclaimer, the term of this patent is extended or adjusted under 35 U.S.C. 154(b) by 354 days.

(21) Appl. No.: 15/131,794

(22) Filed: Apr. 18, 2016

(65) Prior Publication Data
US 2017/0299046 A1    Oct. 19, 2017

(51) Int. Cl.
*F16H 57/04* (2010.01)
*F16D 13/74* (2006.01)
*F16D 13/72* (2006.01)
*F16H 57/027* (2012.01)
*B60K 17/344* (2006.01)

(52) U.S. Cl.
CPC ....... *F16H 57/0423* (2013.01); *B60K 17/344* (2013.01); *F16D 13/72* (2013.01); *F16D 13/74* (2013.01); *F16H 57/027* (2013.01)

(58) Field of Classification Search
CPC .... F16H 57/0457; B60K 17/344; F16D 13/74
See application file for complete search history.

(56) References Cited

U.S. PATENT DOCUMENTS

| 3,145,582 | A |   | 8/1964  | Wagner |
|-----------|---|---|---------|--------|
| 4,351,203 | A | * | 9/1982  | Fukunaga ............ F16H 57/027 137/540 |
| 4,468,979 | A |   | 9/1984  | Inagaki et al. |
| 4,595,118 | A | * | 6/1986  | Azuma ................. B60K 17/16 220/203.27 |
| 4,970,913 | A |   | 11/1990 | Kielar et al. |
| 5,370,018 | A |   | 12/1994 | Kwasniewski |
| 6,029,696 | A |   | 2/2000  | Heatwole |
| 6,058,969 | A | * | 5/2000  | Bollwahn ............ F16H 57/027 137/583 |
| 6,550,595 | B2 | * | 4/2003 | Kuczera ............... F16H 57/027 192/112 |
| 6,719,096 | B2 |   | 4/2004 | Mogi |
| 6,840,137 | B2 | * | 1/2005 | Kaplan ................. F16H 57/027 74/606 R |
| 7,866,231 | B2 | * | 1/2011 | Kincaid ................ F16H 57/027 74/607 |
| 8,529,657 | B2 | * | 9/2013 | Kincaid ................ F16H 57/027 403/31 |

(Continued)

FOREIGN PATENT DOCUMENTS

JP    H10138774 A    5/1998

*Primary Examiner* — Tony H Winner
(74) *Attorney, Agent, or Firm* — Dickinson Wright PLLC

(57) ABSTRACT

A venting arrangement for use with power transfer assemblies of the type used in motor vehicle driveline and drivetrain applications includes a vent oil deflector assembly. The vent oil deflector assembly is associated with an inside wall within an enclosed chamber and is configured to deflect lubricating oil splashed within the chamber away from an air venting passageway. The deflection feature and the venting feature are integrated into a common assembly.

20 Claims, 7 Drawing Sheets

(56) References Cited

U.S. PATENT DOCUMENTS

| | | | |
|---|---|---|---|
| 8,893,744 B2* | 11/2014 | Sigmund | F16H 57/027 |
| | | | 137/351 |
| 9,625,029 B2* | 4/2017 | Vituri | F16H 57/029 |
| 2003/0136219 A1 | 7/2003 | Gotou et al. | |
| 2004/0104077 A1 | 6/2004 | Szalony et al. | |
| 2006/0096411 A1 | 5/2006 | Aldrich et al. | |
| 2007/0000729 A1 | 1/2007 | Lund et al. | |
| 2007/0056400 A1* | 3/2007 | Kennedy | F16H 57/027 |
| | | | 74/607 |
| 2012/0312120 A1 | 12/2012 | Engelmann et al. | |
| 2016/0160992 A1 | 6/2016 | Wotzak et al. | |

* cited by examiner

TRANSFER CASE WITH VENT/OIL DEFLECTOR ASSEMBLY

FIELD OF THE INVENTION

The present disclosure relates generally to power transfer assemblies of the type used to transfer drive torque in motor vehicles. More particularly, the present disclosure relates to an air venting and lubricant deflection arrangement installed within such power transfer assemblies.

BACKGROUND OF THE INVENTION

This section provides background information related to the present disclosure which is not necessarily prior art.

Power transfer assemblies of the type used in motor vehicles such as, for example, four-wheel drive (4WD) transfer cases, all-wheel drive (AWD) power take-off units and axle drive modules are commonly equipped with a torque transfer mechanism. Such torque transfer mechanisms are configured and operable to regulate the transfer of drive torque from a rotary input member to a rotary output member. Typically, the torque transfer mechanism includes a multi-plate friction clutch operably disposed between the input and output members and a clutch actuator for engaging the friction clutch. The degree of clutch engagement, and therefore the amount of drive torque transferred, is a function of the clutch engagement force applied to the friction clutch via the clutch actuator. The rotary input and output members may include a pair of shaft, as is conventional in transfer cases, or a gearset such as is provided in power take-off units.

The clutch actuator typically includes a drive mechanism and a clutch operator mechanism. The clutch operator mechanism is operable to convert the force or torque generated by the drive mechanism into the clutch engagement force which, in turn, is applied to a multi-plate clutch pack associated with the friction clutch. The drive mechanism can be passively actuated or, in the alternative, can include a power-operated device which is controlled in response to control signals from an electronic control unit (ECU) associated with a traction control system. Variable control of the control signals is typically based on changes in road conditions and/or the current operating characteristics of the vehicle (i.e., vehicle speed, acceleration, brake status, steering angle, interaxle speed differences, etc.) as detected by various sensors associated with the traction control system. As such, highly precise control of the drive torque transferred in such adaptive or "on-demand" torque transfer mechanisms permits optimized torque distribution during all types of driving and road conditions.

One factor that impacts the precision or accuracy of the drive torque actually transferred across the friction clutch is the frictional interface between the interleaved clutch plates associated with the multi-plate clutch pack. When the clutch pack is partially engaged, the clutch plates slip relative to one another and generate heat. As is known, lubricating fluid may be routed from a lubricant sump within the power transfer assembly to flow through and around the clutch pack to cool the clutch plates as well as the other clutch components in addition to lubricating bearings and other rotary components. It is well documented that excessive heat generation can degrade the lubricating fluid and damage the clutch plates. It is also well documented that excessive pressure within the power transfer assembly generated via driven rotation of the components of the torque transfer mechanism can detrimentally impact the service life of bearings and seals.

A number of different types of lubrication systems are used in current power transfer assemblies. One lubrication system employs a shaft-drive fluid pump (i.e., gerotor pump) that functions to generate a pumping action for supplying lubricating fluid from the lubricant sump to the friction clutch in response to rotation of a driven shaft. Such shaft-driven fluid pump lubrication systems are typically inefficient due to the continuous pumping operation and the large pumping capacity required to provide adequate lubricant flow rates at both low and high rotational speeds. Another type of lubrication system used in some power transfer assemblies, referred to as a "pump-less" system, relies on the rotary components to transmit the lubricating oil from the lubricant sump to the friction clutch. While such systems are capable of eliminating the need for a pump to provide the lubricant flow requirements, the flow rate and capacity is still directly proportional to the rotary speed of the lubricant-carrying components. It is also known to provide a shaft-driven fluid pump with a pump clutch that is operable for selectively coupling and uncoupling a pump component to the shaft to provide a "disconnectable" pump assembly. Such an arrangement permits on-demand operation of the fluid pump, but its flow rate and capacity are still a function of the shaft speed. Finally, it is also known to mount an electric fluid pump within the lubricant sump. The submerged electric pump can provide on-demand pumping operation independent of shaft speed.

In view of the above, virtually all power transfer assemblies of the type used in motor vehicle drivetrain and driveline applications have components that rotate at very high speeds in an enclosed chamber formed within the housing and which are bathed in, or supplied with, lubricating fluid from the lubricant sump for lubrication and cooling purposes. Due to these high rotational velocities, pressure and heat tend to build up within the enclosed chamber. As such, many power transfer assemblies are also equipped with a venting system having a valve configured for allowing the venting of pressurized air from the enclosed chamber to ambient so as to ensure longer life of the gaskets and seals. In many power transfer assemblies, the valve associated with the venting systems also permit ambient make-up air to be drawn back into the enclosed chamber, without introduction of contaminants, upon subsequent cooling of the lubricating fluid. However, one known drawback associated with conventional venting arrangements is the unintended escape of some lubricating fluid and/or failure of the vent valve due to clogging thereof with contaminants or lubricating fluid.

In some power transfer assemblies, a long vent tube hose is connected between a vent tube fitting on the housing and a remote location within the engine compartment to reduce the risk of contamination ingress and oil burping or leaks, as an option to direct venting systems having a vent valve mounted directly to the housing of the power transfer assembly.

In view of the above, it is recognized that optimized venting and lubricant containment arrangements are required for use with power transfer assemblies to provide enhanced venting and pressure stabilization for extending the service life of the sealing components as well as for preventing escape of lubricating fluid and deterioration of the venting components. Thus, a need exists to develop improved lubrication and venting systems for use in power transfer assemblies which overcome the shortcomings of conventional venting arrangements.

SUMMARY OF THE INVENTION

This section provides a general summary of the disclosure and is not intended to be considered or interpreted as a complete and exhaustive listing of all of the aspects, objectives, features and advantages associated with the inventive concepts of the present disclosure.

It is an aspect of the present disclosure to provide a power transfer assembly for use in motor vehicle drivetrain and/or driveline applications having an air venting and oil deflector arrangement associated with an enclosed chamber formed within a housing of the power transfer assembly.

It is a related aspect to configure the air venting and oil deflector arrangement of the present disclosure to deflect lubricating fluid, as it splashed and transmitted throughout the enclosed chamber, away from an enclosed air channel having an air vent inlet which communicates with an air vent outlet via a deflector baffling.

It is a further related aspect of the present disclosure to form the air vent inlet, the air vent outlet, and the deflector baffling in a raised boss extending from an inside wall segment of the housing. A cover plate is mounted to the raised boss and establishes the enclosed air channel between the cover plate and the wall segment and which is delimited by the raised boss of the housing.

It is yet another related aspect of the air venting and oil deflector arrangement of the present disclosure to configure the deflector baffling portion of the raised boss to define an inlet chamber communicating with the air vent inlet, an outlet chamber communicating with the air vent outlet, and a flow deflection channel therebetween.

It is another aspect of the present disclosure to form the air vent inlet, the air vent outlet, and the deflector baffling in a vent housing configured to be mounted within the enclosed chamber. A cover plate is mounted to the vent housing and establishes an enclosed air channel between the cover plate and the deflector baffling portion of the vent housing.

It is a related aspect to configure the deflector baffling portion of the vent housing to define an inlet chamber communicating with the air vent inlet, an outlet chamber communicating with the air vent outlet, and a flow deflection chamber therebetween. A vent assembly extends between the air vent outlet and an exterior portion of the housing of the power transfer assembly to provide an air venting flow path between the enclosed chamber and ambient. The vent assembly is further operable to allow make-up air to be drawn from ambient into the enclosed chamber.

It is another aspect of the present disclosure that the power transfer assembly be at least one of a transmission, a transfer case, a power take-off unit, and an axle assembly.

These and other aspects, objectives, and features of the present disclosure are provided by a power transfer assembly for use in a four-wheel drive motor vehicle having a powertrain and first and second drivelines. The power transfer assembly comprising a housing defining an enclosed chamber having a sump area filled with a lubricating fluid, a first shaft rotatably supported by said housing and configured to transfer drive torque from the powertrain to the first driveline and a second shaft rotatably supported by said housing in proximity to said sump and configured for connection to the second driveline. The power transfer assembly also includes a transfer mechanism having a first transfer component rotatably supported on the first shaft and a second transfer component drivingly connected to the first transfer component and being fixed for rotation with the second shaft, a clutch operable in a released mode to disconnect the first transfer component from the first shaft and in an engaged mode to connect the first transfer component to the first shaft, and a clutch actuator operable for selectively shifting the clutch between its released and engaged modes. A splash lubrication system is provided within the power transfer assembly for transmitting lubricating fluid from the sump to the clutch in response to rotation of the transfer mechanism. The splash lubrication system includes an air vent/oil deflector assembly located with the enclosed chamber and which is operable to permit air to flow between an ambient environment external to the housing and the enclosed chamber to provide an air pressure equalization feature while inhibiting discharge of lubricating fluid from the enclosed chamber to the ambient environment.

The air vent/oil deflector assembly of the present disclosure includes a body segment covered by a cover plate to define an enclosed air channel having an air vent inlet, an air vent outlet, and a deflector baffling formed between the air vent inlet and the air vent outlet. The air vent inlet communicates with the enclosed chamber and the air vent outlet communicates with the ambient environment.

In accordance with the present disclosure, a transfer case is provided for use in a four-wheel drive vehicle having a powertrain and front and rear drivelines. The transfer case includes a housing defining an enclosed chamber having a sump area filled with a lubricating fluid and a vent port extending through said housing, a rear output shaft rotatably supported by said housing and arranged to transmit drive torque from the powertrain to the rear driveline, and a front output shaft rotatably supported by the housing in proximity to the sump and which is arranged to transmit drive torque to the front driveline. In addition, a transfer mechanism having a first sprocket is rotatably supported on the rear output shaft, a second sprocket is fixed for rotation with the front shaft, and a power chain encircles and drivingly connects the first and second sprockets. A clutch is operable in a released mode to disconnect the first sprocket from driven connection with the rear output shaft and in an engaged mode to drivingly connect the first sprocket to the rear output shaft. The transfer case also includes an air vent/oil deflector assembly located within the enclosed chamber and operable to permit air flow between an ambient environment external to the housing and the enclosed chamber to provide air pressure equalization while inhibiting the discharge of lubricating fluid from the enclosed chamber to the ambient environment. The air vent/oil deflector assembly includes a body segment extending from an inside wall surface of the housing and a cover plate secured to an edge surface of the body segment and which together define an enclosed air channel. The enclosed air channel includes an air vent inlet, an air vent outlet, and a deflector baffling formed therebetween. The air vent inlet communicates with the enclosed chamber and the air vent outlet communicates with a vent tube extending through the vent port.

Further areas of applicability of the present disclosure will become apparent from the detailed description provided hereinafter. It will be understood that the detailed description and specific example embodiments provided herein, while indicating particular configurations and functional characteristics, are intended for purposes of illustration only and are not intended to limit the scope of the inventive concepts associated with the present disclosure.

BRIEF DESCRIPTION OF THE DRAWINGS

The drawings described herein are for illustrative purposes only of selected embodiments and not all possible implementations, and are not intended to limit the scope of the present disclosure.

The present disclosure will become more fully understood from the following detailed description and the accompanying drawings, wherein.

Corresponding reference numerals are used throughout all of the drawings to identify common components.

DETAILED DESCRIPTION

Figure 1:
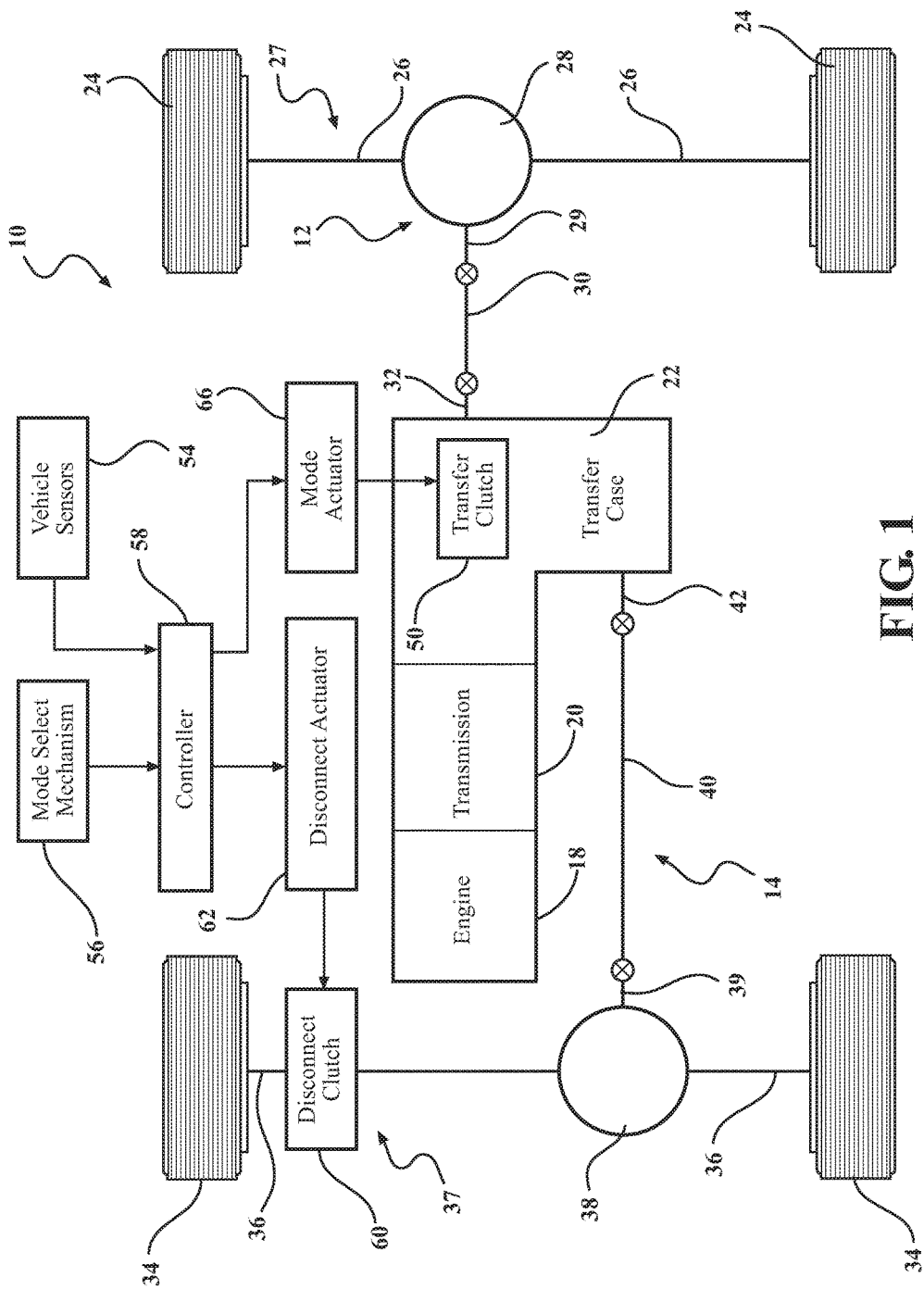
FIG. 1 is a schematic representation of a motor vehicle equipped with at least one power transfer assembly having an air venting and lubricant deflection arrangement constructed and operable in accordance with the teachings of the present disclosure.

Generally speaking, various example embodiments are provided so that this disclosure will be thorough, and will fully convey the scope of the inventive concepts described herein to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

More particularly, the present disclosure is directed to power transfer assemblies for use in vehicular driveline application to transfer drive torque between a pair of rotary components. Furthermore, the power transfer assemblies of the present disclosure each include an air venting and lubricant deflecting arrangement. The power transfer assemblies applicable with the teachings of the present disclosure may include, without limitation, transfer cases, power take-off units, drive axle modules, torque couplings and limited slip/torque-vectoring differential assemblies. Thus, while the present disclosure is directed to describing a particular configuration of one such power transfer assembly for use in a specific driveline application, it will be understood that the arrangement shown is intended to only illustrate examples of embodiments of the present disclosure.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "compromises," "comprising," "including," and "having," are inclusive and therefore specify the presence of stated features, integers, steps, operations, elements, and/or components, but do not preclude the presence or addition of one or more other features, integers, steps operations, elements, components, and/or groups or combinations thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

With particular reference to FIG. 1 of the drawings, a drivetrain 10 for a four-wheel drive motor vehicle is shown to include a first or primary driveline assembly 12, a second or secondary driveline assembly 14, and a powertrain assembly 16. Primary driveline assembly 12 is shown, in this non-limiting drivetrain arrangement, to define the rear driveline while secondary driveline assembly 14 defines the front driveline. Powertrain assembly 16 is operable to generate and deliver rotary power (i.e. drive torque) to the drivelines. Powertrain assembly 16 is shown to include an engine 18, a transmission 20 and a power transfer assembly, hereinafter referred to as transfer case 22.

Primary driveline assembly 12 includes a pair of primary wheels 24 drivingly connected to a corresponding pair of primary axle shafts 26 associated with a primary axle assembly 27. Primary axle assembly 27 further includes a primary differential assembly 28 having a pair of output components drivingly connected to corresponding one of primary axle shafts 26 and which are driven through a speed-differentiating gearset by an input component. Primary differential assembly 28 can be of any known type capable of facilitating intra-axle speed differentiation between primary wheels 24. Primary driveline assembly 12 further includes a primary propeller shaft or propshaft 30 having one end drivingly coupled to a pinion shaft 29 and another end drivingly coupled to a primary output shaft 32 of transfer case 22. Pinion shaft 29 is drivingly coupled via a final drive gearset, such as a primary hypoid gearset, to the input component of primary differential assembly 28.

Secondary driveline assembly 14 includes a pair of secondary wheels 34 drivingly connected to a corresponding pair of secondary axle shafts 36 associated with a secondary axle assembly 37. Secondary axle assembly 37 further includes a secondary differential assembly 38 having a pair of output components drivingly connected to corresponding one of secondary axle shaft 36 and which are driven through a speed-differentiating gearset by an input component. Secondary differential assembly 38 can include any type of gearset configured to facilitate intra-axle speed differentiation between secondary wheels 34. Secondary driveline assembly 14 further includes a secondary propeller or propshaft 40 having one end drivingly coupled to a pinion shaft 39 and another end drivingly coupled to a secondary output shaft 42 of transfer case 22. Pinion shaft 39 is drivingly coupled via a final drive gearset, such as a secondary hypoid gearset, to the input component of secondary differential assembly 38.

With continued reference to FIG. 1, drivetrain 10 is shown to further include an electronically-controlled power transfer system for permitting a vehicle operator to select between a two-wheel drive mode (2WD), a locked four-wheel drive mode (LOCK-4WD), and an adaptive or on-demand four-wheel drive mode (AUTO-4WD). In this regard, transfer case 22 is equipped with a transfer clutch 50 that can be selectively actuated for transferring drive torque from primary/rear output shaft 32 to secondary/front output shaft 42 to establish one of the locked and on-demand four-wheel drive modes. The power transfer system is shown to further include a mode actuator 52 for actuating transfer clutch 50, vehicle sensors 54 for detecting dynamic and operational characteristics of the motor vehicle and/or road/weather conditions, a mode select mechanism 56 for permitting the vehicle operator to select one of the available modes, and an electronic controller unit 58 for controlling actuation of mode actuator 52 in response to input signals from vehicle sensors 54 and mode select mechanism 56. A disconnect clutch 60 may be associated with one of secondary axle shafts 36 or, in the alternative, between pinion shaft 39 and differential assembly 38 to permit selective coupling and de-coupling of secondary wheels 34 relative to secondary propshaft 40. A disconnect actuator 62 is also controlled by controller 58 for controlling actuation of disconnect clutch 60.

Figure 2:
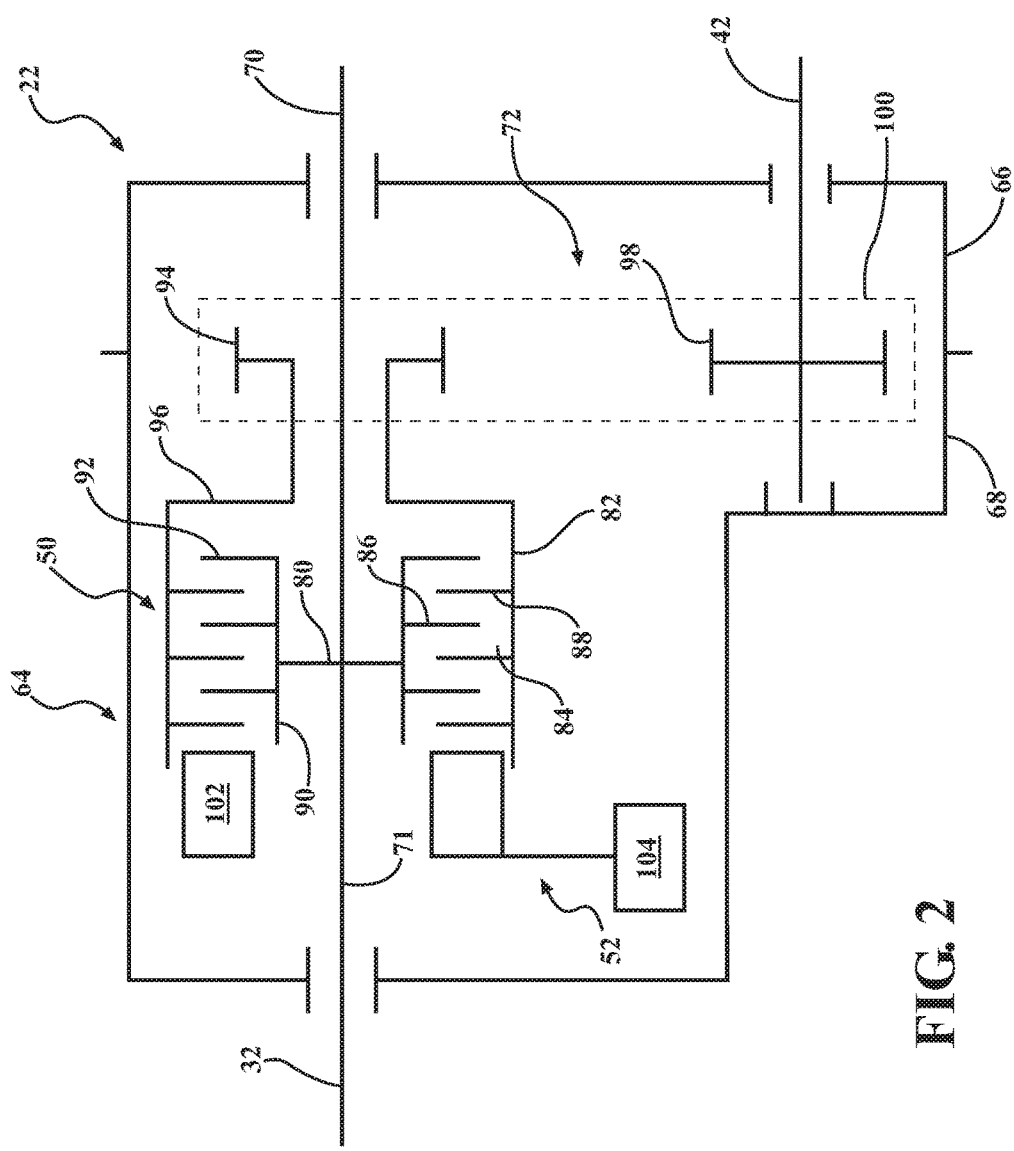
FIG. 2 is a schematic illustration of one of the power transfer assemblies shown in FIG. 1 configured as a single-speed active transfer case.

Referring now to FIG. 2, a schematic representation of an exemplary configuration for transfer case 22 is provided. Transfer case 22 is shown to include a two-piece housing assembly 64 having a first or front housing section 66 and a second or rear housing section 68. Transfer case 22 generally is configured to include an input shaft 70, primary or rear output shaft 32, secondary or front output shaft 42, transfer clutch 50, mode actuator 52, and a transfer assembly 72. Since transfer case 22 is a single-speed configuration, input shaft 70 and rear output shaft 32 are fixed for common rotation and may be formed integrally to define a mainshaft. Transfer clutch 50 is generally shown to include a clutch hub 80 fixed for rotation with rear output shaft 32, a clutch drum 82, and a multi-plate clutch pack 84 including a plurality of alternatingly interleaved inner clutch plates 86 and outer clutch plates 88. Inner clutch plates 86 are splined on a cylindrical hub section 90 of clutch hub 80 while outer clutch plates 88 are splined in clutch drum 82. Clutch hub 80 is also shown to include a reaction ring section 92 that is fixed to cylindrical hub section 90.

Transfer assembly 72 is shown, in this non-limiting embodiment, to include a first sprocket 94 fixed for rotation with a radial plate segment 96 of clutch drum 82, a second sprocket 98, and a power chain 100 connecting first sprocket 94 for rotation with second sprocket 98. First sprocket 94 is rotatably supported on rear output shaft 32 while second sprocket 98 is fixed for common rotation with front output shaft 42.

Mode actuator 52 is schematically shown in FIG. 2 to include a clutch operator mechanism 102 and a power-operated drive unit 104. Drive unit 104 is adapted to receive control signals from controller 58 and cause clutch operator mechanism 102 to generate and exert a clutch engagement force on clutch pack 84. Precise regulation of the magnitude of the clutch engagement force controls the magnitude of drive torque transferred from rear output shaft 32 through transfer clutch 50 and transfer assembly 72 to front output shaft 42. When the 2WD mode is selected, clutch pack 84 is completely disengaged to disconnect front output shaft 42 from rear output shaft 32, whereby all drive torque is transferred from powertrain assembly 16 to primary driveline 12. When the LOCK-4WD mode is selected, clutch pack 84 is fully engaged to couple front output shaft 42 for rotation with rear output shaft 32 and effectively split the total drive torque between primary driveline assembly 12 and secondary driveline assembly 14. When the AUTO-4WD mode is selected, the clutch engagement force applied to clutch pack 84 is adaptively varied to automatically vary the torque distribution between the driveline assemblies to provide optimized traction.

The schematic illustration of transfer case 22 in FIG. 2 is intended to broadly define a single-speed construction which can be assembled in any orientation of the components. In addition, it will be appreciated that transfer assembly 72 can be any type of chain-drive, belt-drive or gear-drive assembly capable of providing the desired function. Likewise, clutch operator mechanism 102 can be any known device capable of generating and applying a clutch engagement force on clutch pack 84 and may include, for example and without limitation, a ball ramp mechanism, a spindle drive mechanism, and a pivot linkage mechanism, etc. Power-generated drive unit 104 may include any electromechanical, magnetorheological, electromagnetic or hydraulic device such as, for example and without limitation, an electric motor, a linear actuator, a solenoid actuator, an electromagnetic actuator and a hydraulic actuator. Transfer case 22 can further include a two-speed range shift system, an interaxle differential and/or a mechanical mode lock system without departing from the inventive concepts disclosed herein.

Figure 3:
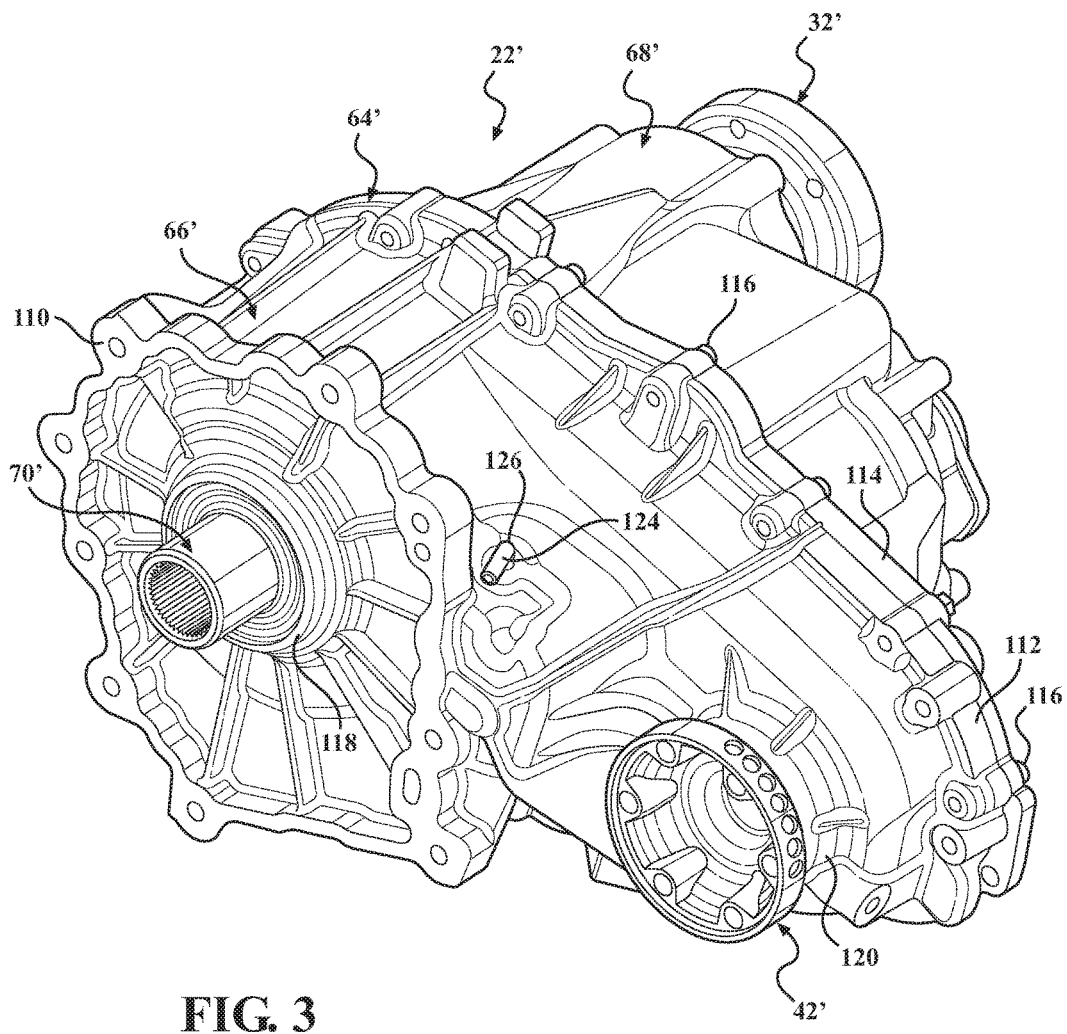
FIG. 3 is an assembled perspective view of a single-speed active transfer case embodying the components shown schematically in FIG. 2 and being equipped with an air-vent/oil deflector assembly constructed and operable in accordance with the teachings of the present disclosure.
Figure 4:
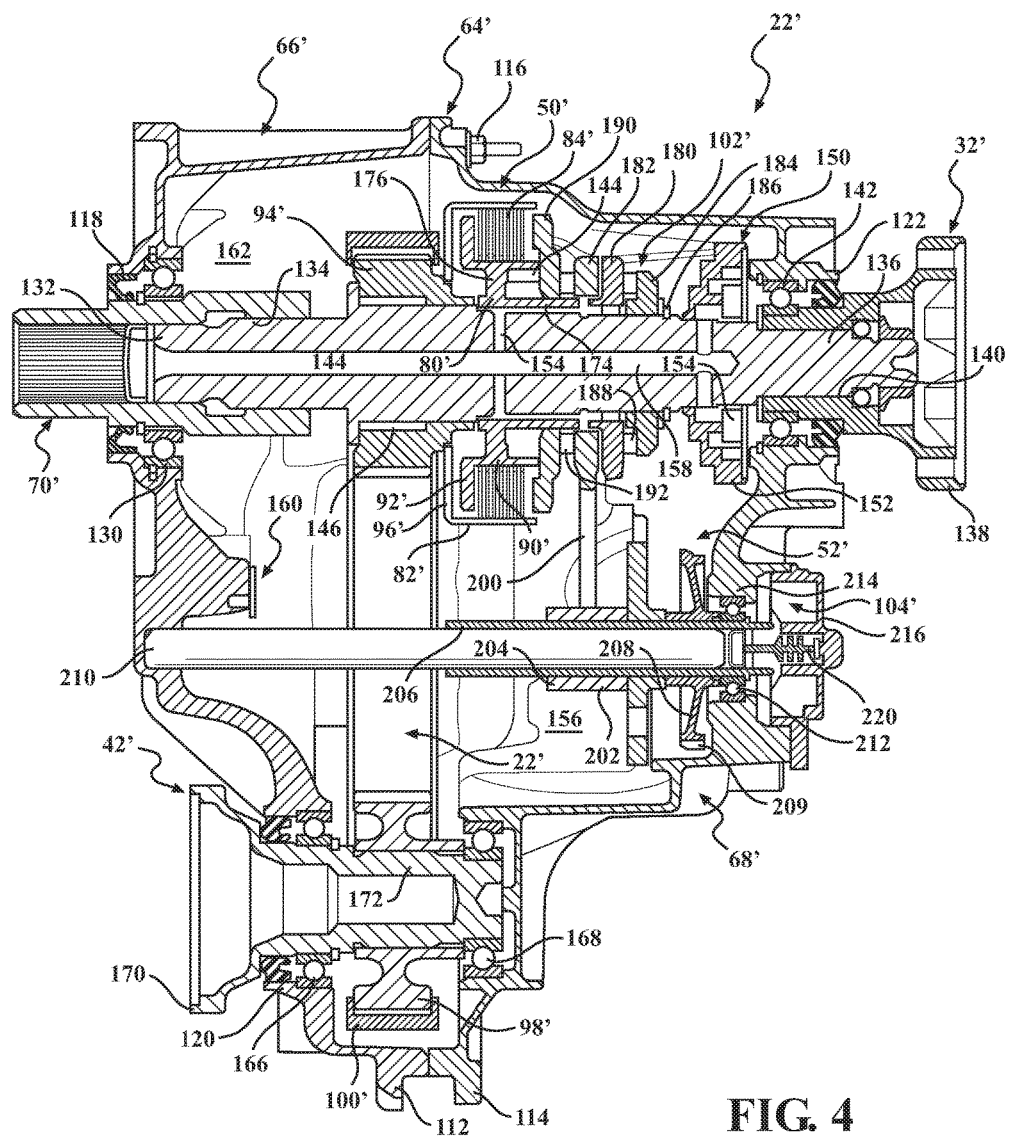
FIG. 4 is a sectional view of the single-speed active transfer case shown in FIG. 3.

Referring now to FIG. 3, an assembled isometric view of a transfer case 22' is shown and which is generally configured to be similar in function and structure to that described in association with the schematic version of transfer case 22 shown in FIG. 2. Primed reference numerals are used hereinafter to designate similar components. Housing assembly 64' includes front housing section 66' and rear housing section 68'. Front housing section 66' includes a forward mounting flange 110 and an aft mounting flange 112. Forward mounting flange 110 is configured to be fastened via suitable fasteners (not shown) to a mating aft mounting flange of a transmission housing associated with transmission 20. Rear housing section 68' is formed to include a forward mounting flange 114 configured to mate with aft mounting flange 112 of front housing section 66' via fasteners, such as bolts 116. Front housing section 66' also is configured to define an input shaft aperture 118 and a front output shaft aperture 120. Rear housing section 68' defines a rear output shaft aperture 122 (FIG. 4). As will be detailed, a raised boss is formed in one of the housing sections and which forms part of an air vent/oil deflector assembly of the present disclosure. A vent tube unit 124 associated with the air vent/oil deflector assembly is shown extending from a vent outlet port 126 formed in front housing section 66' of housing assembly 64'.

Turning now to FIG. 4, a sectional view of transfer case 22' is shown to better illustrate orientation of the internal components. Again, primed reference numerals are used to identify the components of transfer case 22' that are generally equivalent to those components previously identified in the description of schematic transfer case 22. Input shaft 70' is shown extending through input shaft aperture 118 and being rotatably supported in front housing section 66' via a bearing unit 130 for rotation about a first rotary axis. Rear output shaft 32' is also supported for rotation about the first rotary axis and includes a first end segment 132 fixed via a splined connection 134 for rotation with input shaft 70', and a second end segment 136 having a coupling flange 138 fixed thereto via a splined connection 140. A bearing unit 142 rotatably supports coupling flange 138 in rear output shaft aperture 122 of rear housing section 68'.

First sprocket 94' is shown rotatably supported on an intermediate section 144 of rear output shaft 32' via a radial needle bearing unit 146. A lubricant pump 150 includes a pump housing 152 fixed to rear housing section 68' and a pumping unit 154 disposed within pump housing 152 and which is drivingly connected to rear output shaft 32'. Rotation of rear output shaft 32' causes pumping unit 154 to draw a lubricating fluid from a lubricant sump 156 within housing assembly 64' and supply the pressurized lubricating fluid to a central supply bore 158 for delivery via radial supply ports 159 to friction clutch 50' as well as other rotary components situated on rear output shaft 32'. While not specifically shown, a lubrication tube extends between lubricant sump 156 and a pump inlet formed in pump housing 152. As will be detailed, an air vent/oil deflector assembly 160 is provided in association with front housing section 66' of housing assembly 64' to provide an air venting feature between an internal chamber 162 of housing assembly 64' and ambient while also providing an oil deflecting feature to inhibit the undesirable discharge of lubricating fluid to ambient, particularly lubricating fluid splashed within chamber 162 due to rotation of transfer assembly 72' therein.

With continued reference to FIG. 4, transfer case 22' is shown with front output shaft 42' extending through front output shaft aperture 120 and being rotatably supported by housing assembly 64' via a pair of laterally-spaced bearing units 166, 168. A coupling flange 170 is mounted to, or formed integrally with a tubular shaft segment 172 of front output shaft 42'. Second sprocket 98' is fixed to, or formed integrally with, shaft segment 172 of front output shaft 42'. Transfer clutch 50' generally surrounds intermediate segment 144 of rear output shaft 32' and includes a clutch hub 80', a clutch drum 82', and a multi-plate clutch pack 84' therebetween. Clutch hub 80' includes a sleeve segment 174 fixed via a splined connection to intermediate segment 144, and a web segment 176 interconnecting sleeve segment 174 to cylindrical hub section 90'. Clutch drum 82' is shown with its plate segment 96' fixed for rotation with first sprocket 94'.

In the non-limiting embodiment shown in FIG. 4, clutch operator mechanism 102' is a ballramp unit having a stationary reaction or first cam plate 180, an axially and rotatably moveable adjustment or second cam plate 182, and a plurality of thrust elements, such as balls (not shown), each aligned and retained in a pair of first and second cam tracks formed respectively in first and second cam plates 180, 182. A locator plate 184 is fixed for rotation with rear output shaft 32' and is axially located thereon via a retainer ring 186. A thrust bearing unit 188 is located between locator plate 184 and first cam plate 180 to accommodate thrust loading therebetween and rotation of locator plate 184 relative to first cam plate 180. Clutch operator mechanism 102' also includes a pressure plate 190 splined for rotation with clutch drum 82' and which is supported for axial movement relative to clutch pack 84' on sleeve segment 174 of clutch hub 80'. A second thrust bearing unit 192 is located between pressure plate 190 and second cam plate 182 to accommodate thrust loading and relative rotation therebetween. A return spring 194 is disposed between web segment 176 of clutch hub 80' and pressure plate 190 and is operable for normally biasing pressure plate 190 in a first or releasing direction relative to clutch pack 84'.

As is understood, rotation of second cam plate 182 relative to first cam plate 180 results in axial translation of second cam plate 182 and pressure plate 190 relative to clutch pack 84'. Axial movement of pressure plate 190 in the releasing direction reduces the magnitude of a clutch engagement force applied to clutch pack 84' while axial movement of the pressure plate 190 in the opposite, engaging direction increases the magnitude of the clutch engagement force. By variably adjusting the magnitude of the clutch engagement force, proportional control over the amount of drive torque transferred from rear output shaft 32' to front output shaft 42' (through transfer clutch 50' and transfer mechanism 72') is provided.

Power-operated driver unit 104' includes an arrangement for controlling rotation of second cam plate 182 relative to first cam plate 180. In the non-limiting embodiment shown in FIG. 4, an activating lever 200 is integrally formed to extend from second cam plate 182 and includes a follower (not shown) which engages an external cam surface 202 formed on a rotary mode cam 204. Cam surface 202 is configured to cause rotary movement of second cam plate 182 in response to rotation of an actuator shaft 206 to which mode cam 204 is fixed. A control gear 208 is also fixed to actuator shaft 206 and has gear teeth 209 in constant mesh with a gearset (not shown) that, in turn, is driven by an electric motor (not shown) also associated with power-operated driver unit 104'. Actuator shaft 206 is shown surrounding an elongated shift rail 210, with actuator shaft 206 being supported for rotation via a bearing unit 212. An end of actuator shaft 206 extends through an actuator aperture 214 formed in rear housing section 68'. A sensor housing 216 encloses actuator aperture 214 and houses a rotary position sensor 220 that is operable to detect the rotated position of actuator shaft 206. The position signal generated by position sensor 220 is used by controller 58 for controlling the axial position of second cam plate 182 relative to first cam plate 180 and, thus, the clutch engagement force generated and applied to clutch pack 84' by clutch operator mechanism 102'.

Figure 5:
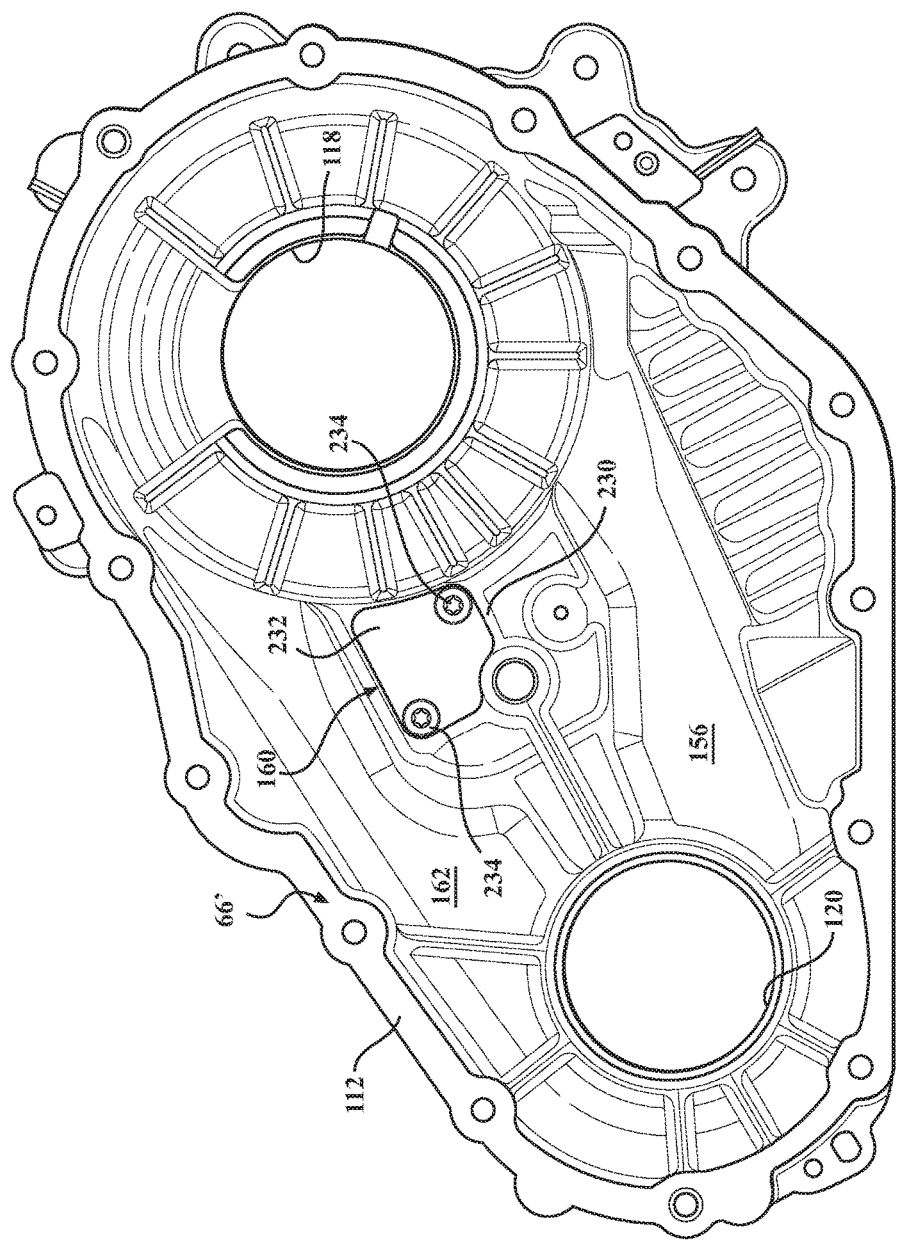
FIG. 5 is an end view of a front housing associated with the transfer case shown in FIGS. 3 and 4 illustrating the location of the air vent/oil deflector assembly of the present disclosure.
Figure 6:
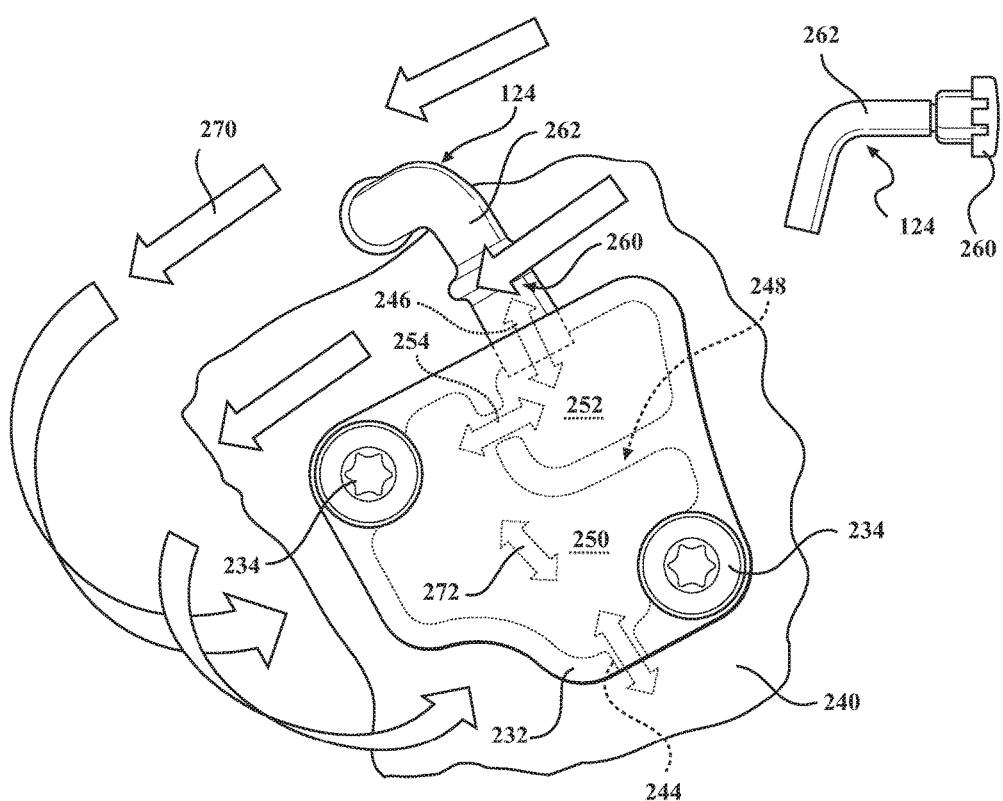
FIG. 6 is an enlarged partial view of FIG. 5 with a cover member associated with the air vent/oil deflector assembly shown transparent to illustrate a deflected lubricant splash flow path and an air vent flow path.
Figure 7:
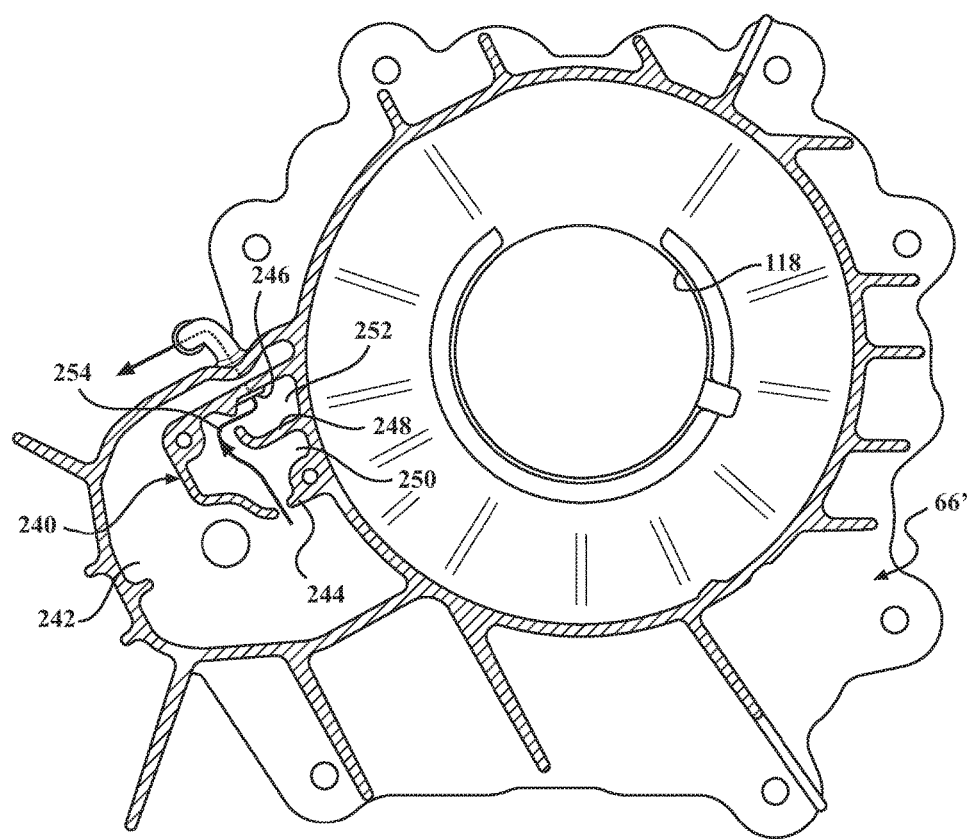
FIG. 7 is a partial view of the front housing illustrating a raised boss segment formed in a wall segment and which cooperates with the cover member to define the air vent/oil deflector assembly.

Referring now to FIGS. 5 through 7 of the drawings, a more detailed description of air vent/oil deflector assembly 160 will be provided. In general, air vent/oil deflector assembly 160 is configured to deflect the lubricating fluid splashed within chamber 162, as a result of rotation of transfer assembly 72' therein, while providing an enclosed air channel for permitting excessively pressurized air to be discharged from chamber 162 to the exterior of transfer case 22' (i.e. ambient) in a manner preventing the undesirable discharge of lubricating fluid through the enclosed air channel.

Assembly 160 includes a body segment 230 and a cover plate 232 secured to body segment 230 via fasteners 234. Body segment 230, in accordance with one non-limiting embodiment, is integrally formed in front housing section 66' via a raised boss 240 extending inwardly from an inside wall surface 242. Raised boss 240 is configured to define an air vent inlet 244, an air vent outlet 246, and a deflector baffling section 248 defining a flow pathway between air vent inlet 244 and air vent outlet 246. Deflector baffling section 248 is configured to define an inlet chamber 250 communicating with air vent inlet 244, an outlet chamber 252 communicating with air vent outlet 246, and a flow deflection channel 254 between inlet chamber 250 and outlet chamber 252. Vent tube unit 124 extends between air vent outlet 246 and ambient and includes a Gore vent 260 and a vent tube 262 passing through vent outlet port 126 in front housing section 66'.

In terms of orientation, air vent inlet 244 is defined at the bottom of boss 240 while air vent outlet 246 is located above inlet 244. Arrows 270 in FIG. 6 illustrate the lubricant splash path within chamber 162 during most motive operating conditions, while arrows 272 illustrate the air venting path between enclosed chamber 162 and vent tube unit 124. The size of chambers 250, 252 and the transverse orientation of flow deflection channel 254 are selected and configured to prevent lubricating fluid from communicating with vent outlet 246. Specifically, air enters air vent inlet 244 and flows into inlet chamber 250. Baffling 248 is configured to delimit inlet chamber 250 from outlet chamber 252 while providing flow deflection channel 254. In the unlikely event that splashed lubricating oil enters inlet chamber 250 via air vent inlet 244, gravity will provide a means for discharging such lubricating fluid. The orientation of deflection channel 254 inhibits the transfer of any lubricating fluid from inlet chamber 250 to outlet chamber 252. Cover plate 232 is generally planar and has an underside surface configured to sealingly engage an outer edge surface of raised boss 240. Mounting holes in cover plate 232 and boss 240 are aligned for subsequent receipt of fasteners 234.

As an alternative to integrated vent assembly 160, the present disclosure contemplates a stand-alone unit having a sealed box-like configuration which integrates the baffling arrangement of boss 240 into a vent housing configured to be mounted to inside wall surface 242 of front housing section 66'. Cover plate 232 would again be mounted to vent housing via fasteners 234 which could possibly be configured to also secure the vent housing to inside wall surface 242. The vent housing of this stand-alone unit would be configured to include an air vent inlet, an inlet chamber communicating with the air vent inlet, a vent outlet, an outlet chamber communicating with the air vent outlet, and a deflector channel providing a flow pathway between the inlet and outlet chambers. Preferably, each of these features is formed by wall portions of the vent housing and which are sealingly enclosed by cover plate 232. A tubular portion connected to air vent outlet would extend through aperture 126 in housing assembly 64' and facilitate assembly of vent unit 124 therewith. Suitable fasteners would be used to securely locate and retain the stand-alone vent/oil deflector assembly within chamber 162.

Those skilled in the art will recognize the advantages associated with providing a power transfer system with a torque transfer mechanism having an on-demand lubrication system of the present disclosure. As such, the present teachings are expressly intended to encompass the inclusion of an externally-mounted fluid pump assembly in conjunction with internal lubricant supply and delivery components in torque transfer mechanisms other than transfer cases. These alternative torque transfer mechanisms may include, without limitation, power take-off units, torque couplings, axle drive modules, limited slip differentials and torque vectoring assemblies having a friction clutch and rotary components that can be lubricated/coded with greater efficiency and optimization by integration of the on-demand lubrication system of the present inventions.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A power transfer assembly for use in a four-wheel drive motor vehicle having a powertrain and first and second drivelines, the power transfer assembly comprising:
    a housing defining an enclosed chamber having a sump area filled with a lubricating fluid;
    a first shaft rotatably supported by said housing and configured to transfer drive torque from the powertrain to the first driveline;
    a second shaft rotatably supported by said housing in proximity to said sump and configured for connection to the second driveline;
    a transfer mechanism having a first transfer component rotatably supported on said first shaft and a second transfer component drivingly connected to said first transfer component and being fixed for rotation with said second shaft;
    a clutch operable in a released mode to disconnect said first transfer component from said first shaft and in an engaged mode to connect said first transfer component to said first shaft;
    a clutch actuator operable for selectively shifting said clutch between its released and engaged modes; and a splash lubrication system for transmitting lubricating fluid from said sump to said clutch in response to rotation of said transfer mechanism, said splash lubrication system including an air vent/oil deflector assembly located within said enclosed chamber and which is operable to permit air to flow between an ambient environment external to said housing and said enclosed chamber to provide an air pressure equalization feature while inhibiting the discharge of lubricating fluid from said enclosed chamber to the ambient environment, said air vent/oil deflector assembly including a body segment covered by a cover plate to define an enclosed air channel having an air vent inlet, an air vent outlet, and a deflector baffling formed between said air vent inlet and said air vent outlet, wherein said air vent inlet communicates with said enclosed chamber and said air vent outlet communicates with the ambient environment.

2. The power transfer assembly of claim 1 wherein said body segment of said air vent/oil deflector assembly is associated with an inner wall section of said housing.

3. The power transfer assembly of claim 2 wherein said body segment is formed integrally with said inner wall section of said housing and defines a raised boss section, and wherein said deflector baffling is formed in said raised boss segment to include an air inlet chamber in communication with said air vent inlet, an air outlet chamber in communication with said air vent outlet, and a transverse flow deflection channel extending between said air inlet chamber and said air outlet chamber.

4. The power transfer assembly of claim 3 wherein said cover plate is secured to an edge surface of said raised boss section and cooperates with said body segment to define each of said air inlet chamber, said air outlet chamber, and said flow deflection channel.

5. The power transfer assembly of claim 4 wherein said flow deflection channel is arranged to inhibit the flow of lubricating fluid from said inlet chamber to said outlet chamber.

6. The power transfer assembly of claim 5 wherein said air vent/oil deflector assembly further includes a valve unit extending through a vent bore formed in said housing and providing an air flow pathway between said air vent outlet and the ambient environment.

7. The power transfer assembly of claim 4 wherein fasteners are provided for attaching said cover plate to said edge surface of said raised boss section of said housing.

8. The power transfer assembly of claim 2 wherein said body segment of said air vent/oil deflector assembly is a vent housing secured to said inner wall section of said housing.

9. The power transfer assembly of claim 8 wherein said vent housing is configured to include said air vent inlet, an air inlet chamber communicating with said air vent inlet, said air vent outlet, an air outlet chamber communicating with said air vent outlet, and a transverse flow deflection channel extending between said air inlet chamber and said air outlet chamber.

10. The power transfer assembly of claim 9 wherein said cover plate is secured to an edge surface of said vent housing, wherein said deflector baffling of said vent housing defines said air inlet chamber, said transverse flow deflection channel and said air outlet chamber, and wherein said cover plate encloses said deflector baffling.

11. The power transfer assembly of claim 10 wherein fasteners are provided for attaching said cover plate to said edge surface of said raised boss section of said housing.

12. The power transfer assembly of claim 9 wherein said flow deflection channel is arranged to inhibit flow of lubricating fluid from said air inlet chamber into said air outlet chamber.

13. The power transfer assembly of claim 12 wherein said air vent/oil deflector assembly further includes a valve unit extending through a vent bore formed in said housing and providing an air flow pathway between said air vent outlet and the ambient environment.

14. The power transfer assembly of claim 1 wherein said clutch is a multi-pack friction clutch assembly surrounding said first shaft and including a first clutch member drivingly connected to said first shaft, a second clutch member drivingly connected to said first transfer component, and a clutch pack of interleaved first and second clutch plates drivingly coupled to corresponding ones of said first and second clutch members, and wherein said clutch actuator is operable for moving an apply member relative to said clutch pack so as to control the magnitude of a clutch engagement force exerted thereon and concurrently control the amount of drive torque transmitted from said first shaft through said transfer mechanism to said second shaft.

15. The power transfer assembly of claim 14 wherein said transfer mechanism includes a first sprocket surrounding said first shaft, a second sprocket fixed for rotation with said second shaft, and a power chain encircling said first and second sprockets, wherein said first clutch member is a clutch hub fixed for rotation with said first shaft and said second clutch member is a clutch drum fixed for rotation with said first sprocket.

16. The power transfer assembly of claim 1 wherein said power transfer assembly is one of a transfer case and a power take-off unit.

17. The power transfer assembly of claim 16 wherein said air vent/oil deflector assembly further includes a valve unit associated with said vent tube extending through said vent bore formed in said housing, wherein said valve unit provides an air flow pathway between said air vent outlet and the ambient environment.

18. A transfer case for use in a four-wheel drive vehicle having a powertrain and front and rear drivelines comprising:

a housing defining an enclosed chamber having a sump area filled with a lubricating fluid, and a vent port extending through said housing;

a rear output shaft rotatably supported by said housing and arranged to transmit drive torque from the powertrain to the rear driveline;

a front output shaft rotatably supported by said housing in proximity to said sump and arranged to transmit drive torque to said front driveline;

a transfer mechanism having a first sprocket rotatably supported on said rear output shaft, a second sprocket fixed for rotation with said front shaft, and a power chain encircling and drivingly connecting said first and second sprockets;

a clutch operable in a released mode to disconnect said first sprocket from driven connection with said rear output shaft and in an engaged mode to drivingly connect said first sprocket to said rear output shaft; and an air vent/oil deflector assembly located within said enclosed chamber and operable to permit air flow between an ambient environment external to said housing and said enclosed chamber so as to provide air pressure equalization while inhibiting the discharge of lubricating fluid from said enclosed chamber to the ambient environment, said air vent/oil deflector assembly including a body segment extending from an inside wall surface of said housing and a cover plate secured to an outer edge surface of said body segment and which together define an enclosed air channel, wherein said enclosed air channel includes an air vent inlet, an air vent outlet, and a deflector baffling formed therebetween, and wherein said air vent inlet communicates with said enclosed chamber and said air vent outlet communicates with a vent tube extending through said vent port.

19. The power transfer assembly of claim 18 wherein said body segment is formed integrally with said inner wall section of said housing and defines a raised boss section, and wherein said deflector baffling is formed in said raised boss segment to include an air inlet chamber in communication with said air vent inlet, an air outlet chamber in communication with said air vent outlet, and a transverse flow deflection channel extending between said air inlet and outlet chambers.

20. The power transfer assembly of claim 19 wherein said flow deflection channel is arranged to inhibit the flow of lubricating fluid from said inlet chamber to said outlet chamber.

* * * * *